United States Patent
V

(10) Patent No.: US 12,363,567 B2
(45) Date of Patent: Jul. 15, 2025

(54) CAPTURING MULTIUSER DATA PACKETS BY GROUPING ACCESS POINTS ON A WIRELESS NETWORK

(71) Applicant: Fortinet, Inc., Sunnyvale, CA (US)

(72) Inventor: Vijayakumar V, Ulsoor (IN)

(73) Assignee: Fortinet, Inc., Sunnyvale, CA (US)

( * ) Notice: Subject to any disclaimer, the term of this patent is extended or adjusted under 35 U.S.C. 154(b) by 380 days.

(21) Appl. No.: 17/855,502

(22) Filed: Jun. 30, 2022

(65) Prior Publication Data

US 2024/0007882 A1    Jan. 4, 2024

(51) Int. Cl.
*G06F 15/16*     (2006.01)
*H04W 24/08*     (2009.01)
*H04W 84/12*     (2009.01)

(52) U.S. Cl.
CPC ............ *H04W 24/08* (2013.01); *H04W 84/12* (2013.01)

(58) Field of Classification Search
CPC .............................. H04W 24/08; H04W 84/12
See application file for complete search history.

(56) References Cited

U.S. PATENT DOCUMENTS

| | | | | |
|---|---|---|---|---|
| 2006/0098613 A1* | 5/2006 | Kish | ............... | H04W 72/30 455/414.1 |
| 2007/0168555 A1* | 7/2007 | Dorenbosch | .......... | H04L 65/611 709/245 |
| 2023/0246946 A1* | 8/2023 | Lee | ........... | H04L 65/80 709/238 |
| 2023/0345310 A1* | 10/2023 | Li | ........... | H04W 76/40 |

\* cited by examiner

*Primary Examiner* — Lan-Huong Truong
(74) *Attorney, Agent, or Firm* — Law Office of Dorian Cartwright; Dorian Cartwright

(57) ABSTRACT

A capture group of access points formed from the plurality of access points dedicate at least one radio from each of the access points for capturing data packets. Captured data packets are received by wireless transmission from each of access point of the capture group of access points. The access points of the capture group are preferably geographically dispersed to increase capture range. The captured data packets are analyzed to identify a set of multiuser data packets. To do so, the set of multiuser data packets is checked against a set of rules for multiuser data packets to troubleshoot wireless network issues.

20 Claims, 6 Drawing Sheets

CAPTURING MULTIUSER DATA PACKETS BY GROUPING ACCESS POINTS ON A WIRELESS NETWORK

FIELD OF THE INVENTION

The invention relates generally to computer networking, and more specifically, to capturing multiuser data packets on a wireless network by grouping access point devices from a plurality of access points.

BACKGROUND

Wireless computing technologies provide untethered access to the Internet and other networks. One of the most critical technologies for wireless networking (or Wi-Fi) is the IEEE 802.11 family of protocols promulgated by the Institute of Electrical and Electronics Engineers. Currently, the protocols are widely adopted in wireless devices such as laptop computers, tablet computers, smart phones, and network access applications. Many networks with wireless devices use an access point (access point) with a radio and antenna as an interface between wireless devices and the backbone network which is typically wired. Wireless devices can discover available access points within range of their radios by listening for beacons broadcast by access points which include an identifier such as an SSID. Wireless devices use the identifier in a probe request to initiate a connection to the identified access point.

For troubleshooting the wireless network, data packets are periodically sampled to check for issues. Problematically, broadcast data packets and multicast data packets are transmitted concurrently and are generally missed by periodic sampling from single locations.

What is needed is a robust technique for capturing multiuser data packets by grouping access points on a wireless network.

SUMMARY

To meet the above-described needs, methods, computer program products, and systems for capturing multiuser data packets by grouping access points on a wireless network.

In one embodiment, a capture group of access points formed from the plurality of access points dedicate at least one radio from each of the access points for capturing data packets. Captured data packets are received by wireless transmission from each of access point of the capture group of access points. The access points of the capture group are preferably geographically dispersed to increase capture range.

In another embodiment, the captured data packets are analyzed to identify a set of multiuser data packets. One example analysis uses parallel transmission time and common data from each data packet to isolate matching sets. The set of multiuser data packets is checked against a set of rules for multiuser data packets to troubleshoot wireless network issues. Some of the networking issues cannot be accurately diagnosed without multiple data packets from the transaction. Other network issues cannot be diagnosed at all.

Advantageously, network performance is improved with better diagnosis of network issues. In turn, network devices will operate better with better network performance.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for capturing multiuser data packets by grouping access points on a wireless network. One of ordinary skill in the art will recognize many alternative embodiments that are not explicitly listed based on the following disclosure.

Figure 2:
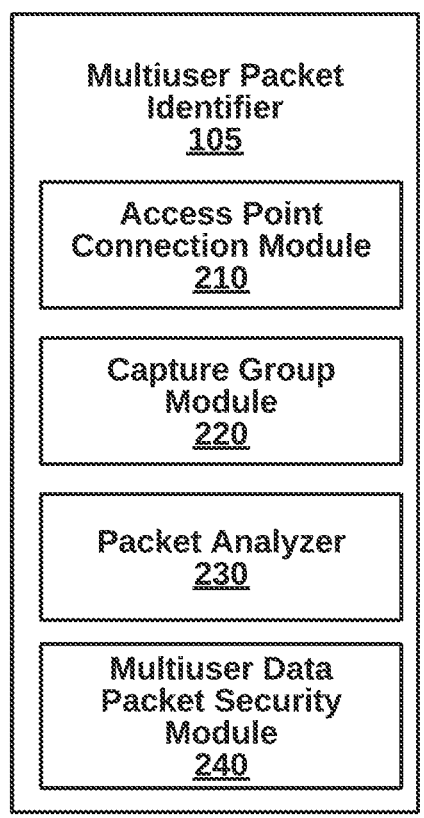
FIG. 2 is a more detailed block diagram illustrating a multiuser packet identifier of the system of FIG. 1, according to one embodiment.
Figure 3:
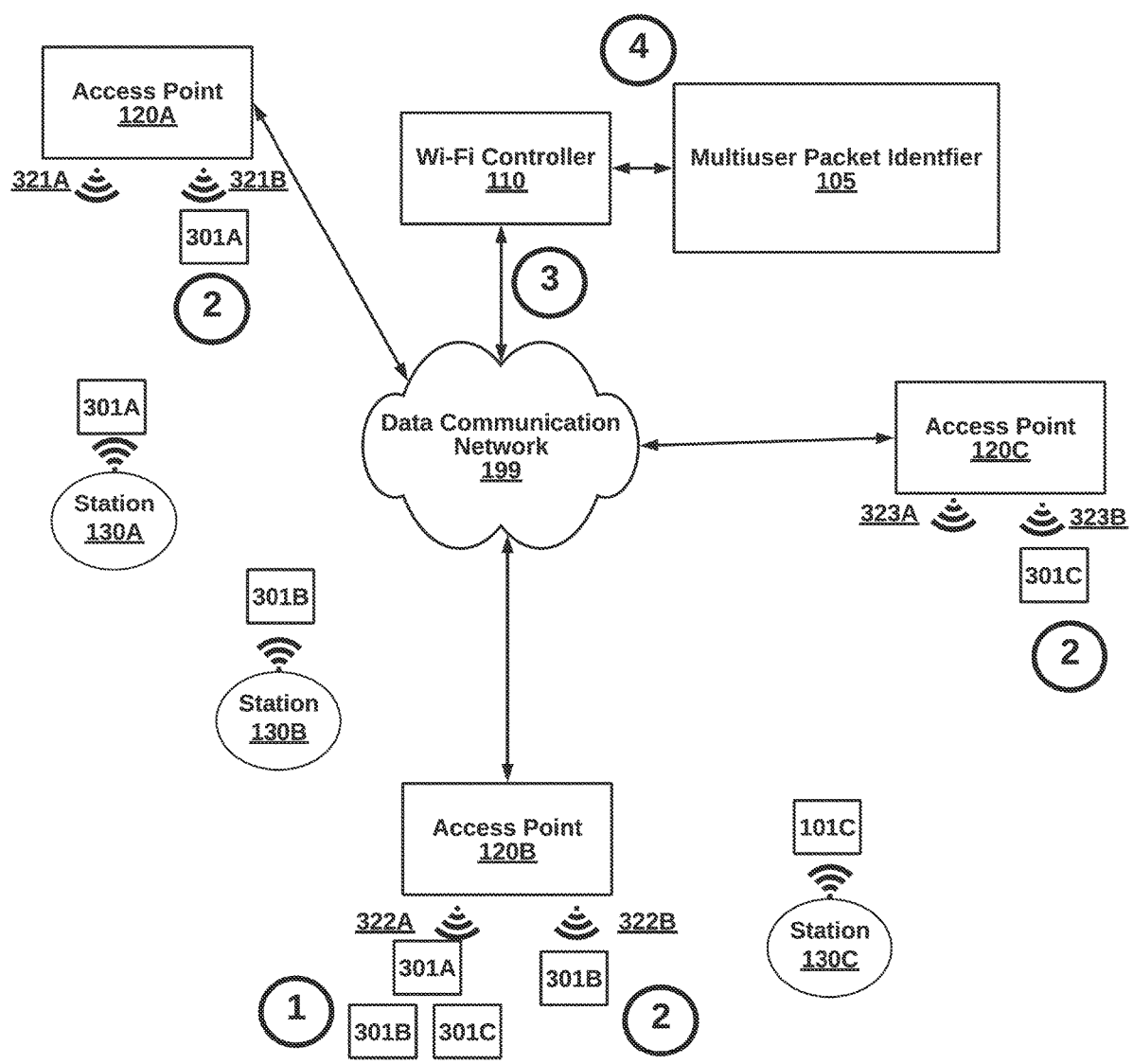
FIG. 3 is a high-level block diagram illustrating the system of FIG. 1 analyzing data packets for multiple data packets, according to one embodiment.

I. Systems for Capturing Multiuser Data Packets (FIGS. 1-3)

Figure 1:
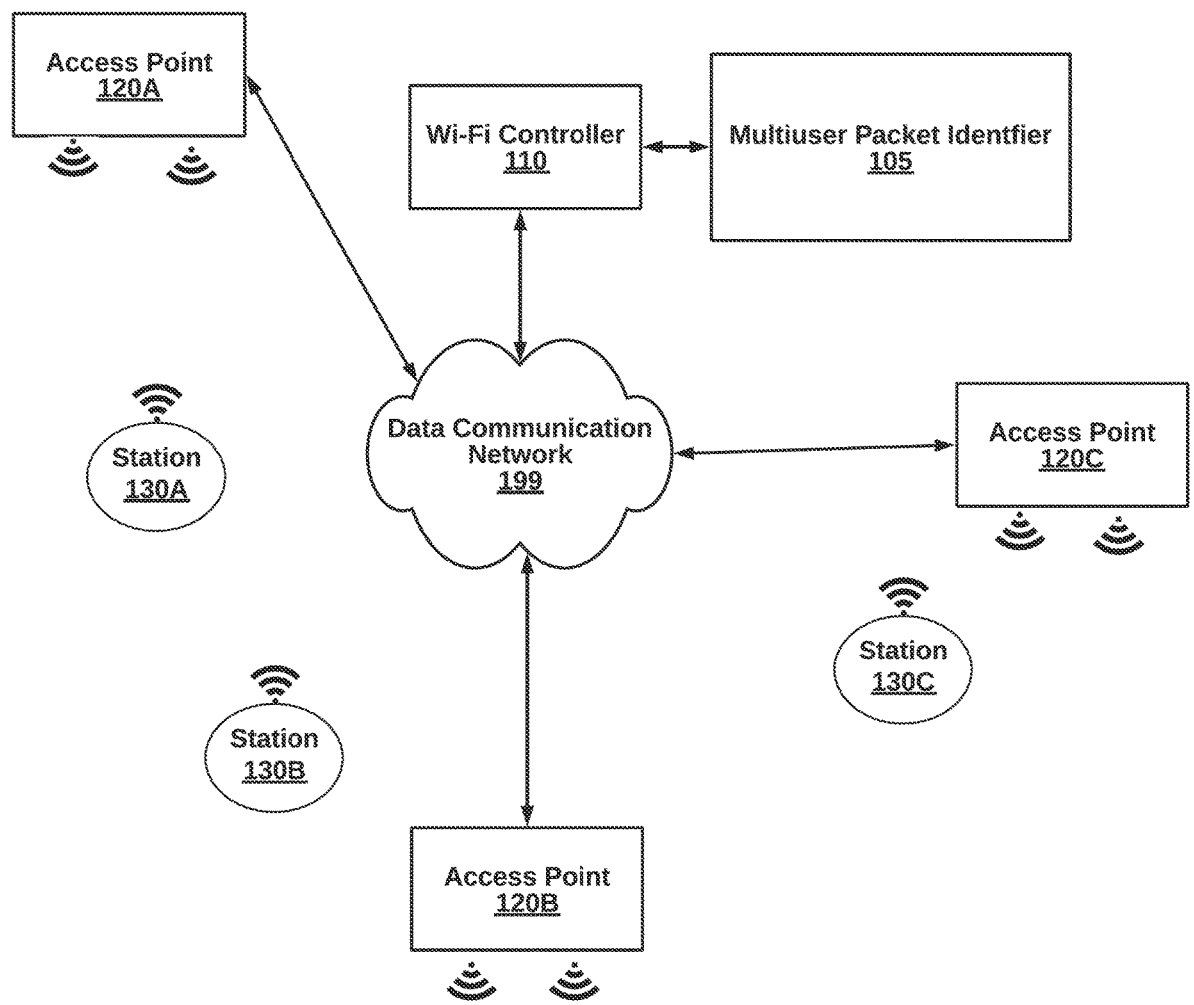
FIG. 1 is a high-level block diagram illustrating a system for capturing multiuser data packets by grouping access points on a wireless network, according to one embodiment.

FIG. 1 is a high-level block diagram illustrating a system 100 for capturing multiuser data packets by grouping access points on a wireless network, according to one embodiment. The system 100 includes a multiuser packet identifier 105, a Wi-Fi controller 110, a group of access point 120A-C, and stations 130A-C, coupled in communication with a data communication network 199. Other embodiments of the system 100 can include additional network components that are not shown in FIG. 1. For example, there can be more access points (authorized and unauthorized) and more stations. There can also be network devices such as switches, routers, fire walls, proxy servers, and the like. FIG. 3 is a high-level block diagram illustrating the system 100 of FIG. 1 analyzing data packets for multiple data packets.

The components of the system 100 are coupled in communication over the data communication network. The components can be connected to the data communication system via hard wire (e.g., the Wi-Fi controller 110 and the group of access points 120A-C). The components can also be connected via wireless networking (e.g., the stations 130A-C). The data communication network 199 can be composed of any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802,11r, and the like. Components can use IPv4 or IPv6 address spaces.

The multiuser packet identifier 105 compares data packets captured from different points in the group of access points, over a window of time, to identify multiuser data packets. In general, multiuser data packets can include broadcast packets, multicast packets, and some unicast packets. Using multicast, a source can send a single copy of data to a single multicast address, which is then distributed to an entire group of recipients. Multicast can be one-to-many or many-to-many. Multiuser packet sets, once identified, provide deeper information for troubleshooting wireless and related networking issues. As a result of improved diagnosis, remediation of networking issues can be more effective. In some embodiments, the data packet analyzer 105, configures the group of access points for capturing. Selected access points switch modes from full-service access points to partial service access points, by dedicating one or more transceivers to capturing data packets.

The multiuser packet identifier 105 can be independent of the Wi-Fi controller 110, or be integrated within. Additional embodiments of the multiuser packet identifier 105 are set forth below in association with FIG. 2.

The group of access points 120A-C are composed of individual access points managed by the Wi-Fi controller 110. Each access point has multiple transceivers, some of which are out of use and others which are available for repurposing for scanning.

Figure 6:
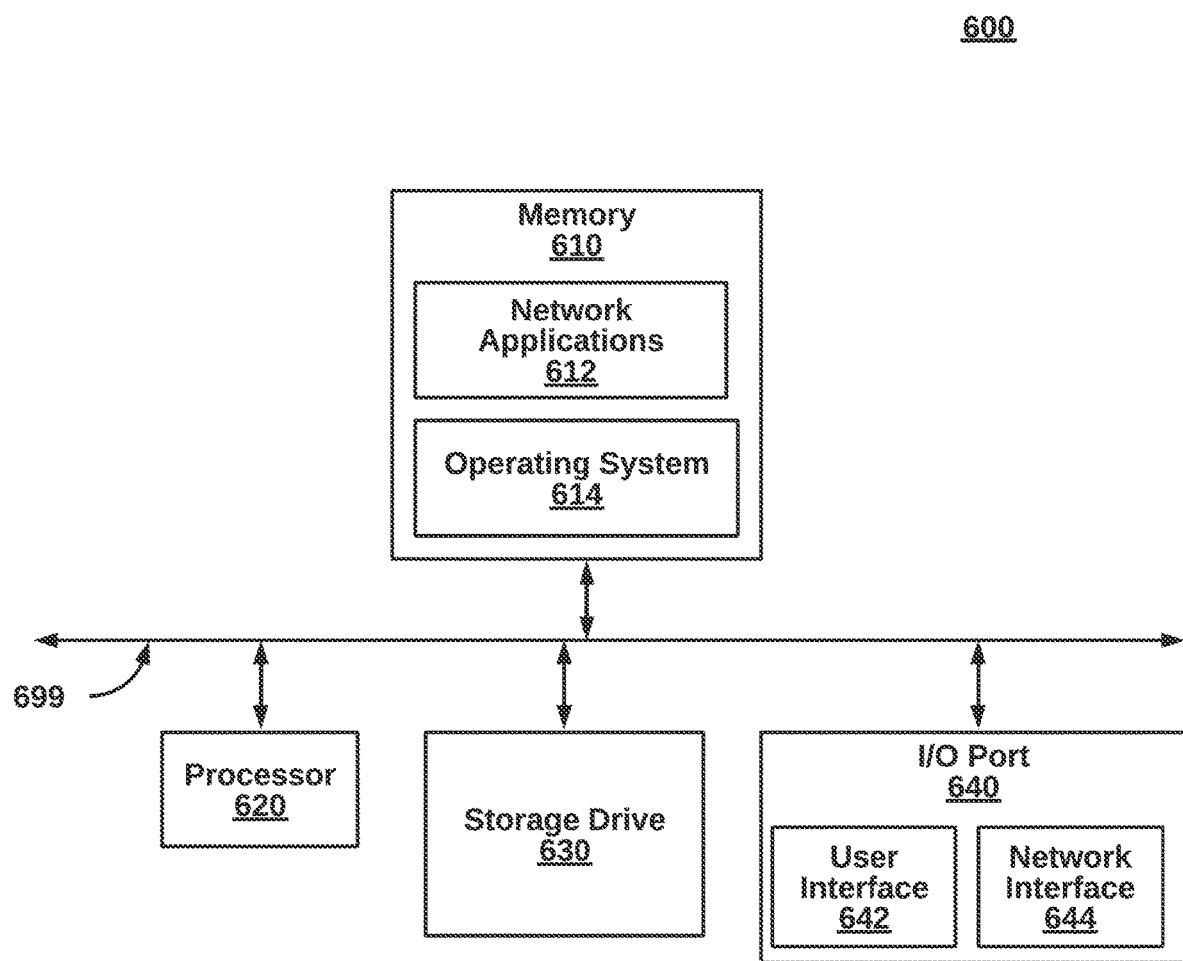
FIG. 6 is a block diagram illustrating an exemplary computing device, according to one embodiment.

The access points 120A-C can be any of the computing devices, such as a personal computer, a server blade, any computing environment as shown in FIG. 6. The access points 120, 130 are preferably connected to the network (or to a switch, router, hub, or another access point that is connected to the network 199) via a wired or wireless connection. The access points 120A-C can be set-up in various configurations with other access points to provide wireless coverage areas. In one embodiment, the functionality is incorporated into a switch or router, and in another embodiment, is incorporated into a custom enclosure. In operation, the access points 120A-C transmit network packets to and from stations.

The stations 130A-C use access points to for access to the wired backbone and to other devices on a Wi-Fi network. When mobile, the stations 130A-C can connect with access point 120A and then later connect with access point 120B, without interruption of services. The stations 130A-C can be implemented as, for example, a mobile station, STA, client or wireless device, a personal computer, laptop, tablet computer, smart phone, mobile computing device, Internet access applications, end station or any other computing device as described in FIG. 6. The stations 130A-C are wirelessly couples to access points using a radio and antenna. No pre-configuration or client is needed. The stations 130A-C can operate according to wireless standards such as IEEE 802.11a, b, g, n, ac, w or any other wireless standard.

FIG. 2 is a more detailed block diagram illustrating the Wi-Fi controller 110 of the system of FIG. 1, according to one embodiment. The multiuser packet identifier 105 includes an access point connection module 210, a capture group module 220, a packet analyzer 230, and a multiuser data packet security module 240. The components can be implemented in hardware, software, or a combination of both.

The access point connection module 210 manages connections to access points and their network operations. Stations that are connected to each access point are also tracked as they move to different access points on a wireless network.

The capture group module 220 forms and tracks one or more capture group of access points from the plurality of access points dedicating at least one radio from each of the access points for capturing data packets. Different capture groups can have different purposes and thus different configurations. A daemon, operating system program, or application of an access point communicates by sending data packets captured, along with metadata about the data packets. In some embodiments, multiple groups are formed, and access points can be restricted to one group, or be part of several groups. One implementation generates a graphical layout for user ease. The graphical layout can display, for example, a range (e.g., circumferential) around each access point and a resulting contiguous boundary around each capture group range. The user can drag and drop elements with a touchscreen, mouse, or other appropriate interface while configuring security settings of the local network.

The packet analyzer 230 receives captured data packets forwarded from access points of the capture group of access points. The captured data packets are analyzed to identify a set of multiuser data packets based on parallel transmission time and common data from each data packet (e.g., session identifier, source IP, destination IP, channel number and port number). In another example, a packet captured at different locations can be compared to detect a location with anomalous data packets. Many other variations are possible.

The multiuser data packet security module 240 checks the set of multiuser data packets against a set of rules for multiuser data packets to troubleshoot wireless network issues. One embodiment includes a rules database that has an initial set of default rules. A user can log in and update rules, create new rules, delete rules, and change conditions for rules, among other network security tasks.

FIG. 3 is one example of interactions between the components of the system 100, while analyzing data packets for multiple data packets. More specifically, at step 1, a group of data packets 301A-C are transmitted substantially simultaneously, or sequentially. Each packet is subsequently received corresponding access points, at step 2, packet 301A by transceiver 301A of access point 120A. An alternative sends one data packet and different instances of the same data packet are received at each access point, and having distinct information about transmission over different geographical regions of a local network. The data packets received from dispersed locations are received at the Wi-Fi controller 110 at step 3. An analysis, as described herein, occurs at step 4 by the multiuser packet identifier 105. Alternative embodiments having the multiuser packet identifier 105 embedded within the Wi-Fi controller 110 will perform this step internally.

II. Methods for Capturing Multiuser Data Packets
(FIGS. 4-5)

Figure 4:
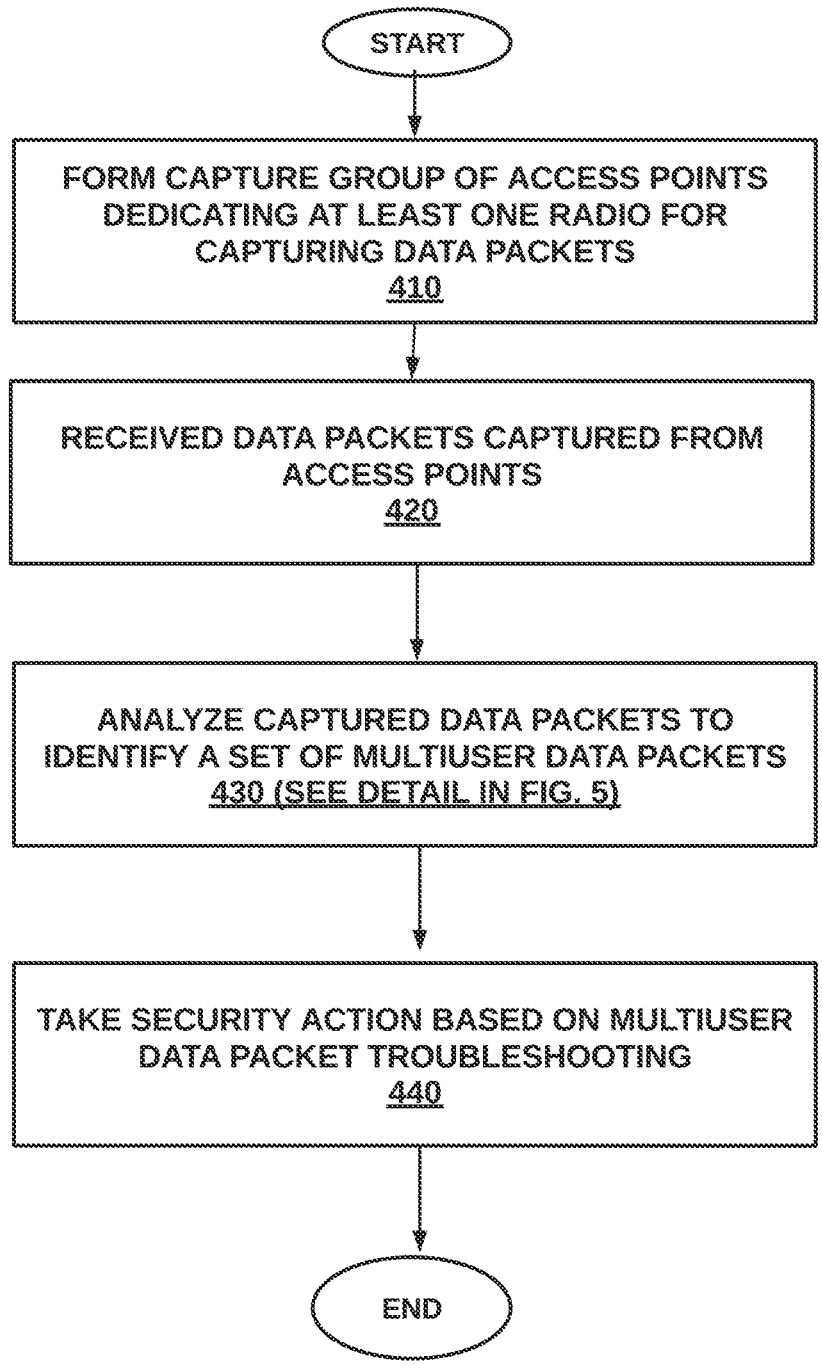
FIG. 4 is a high-level flow diagram illustrating a method for capturing multiuser data packets by grouping access points on a wireless network, according to one embodiment.
Figure 5:
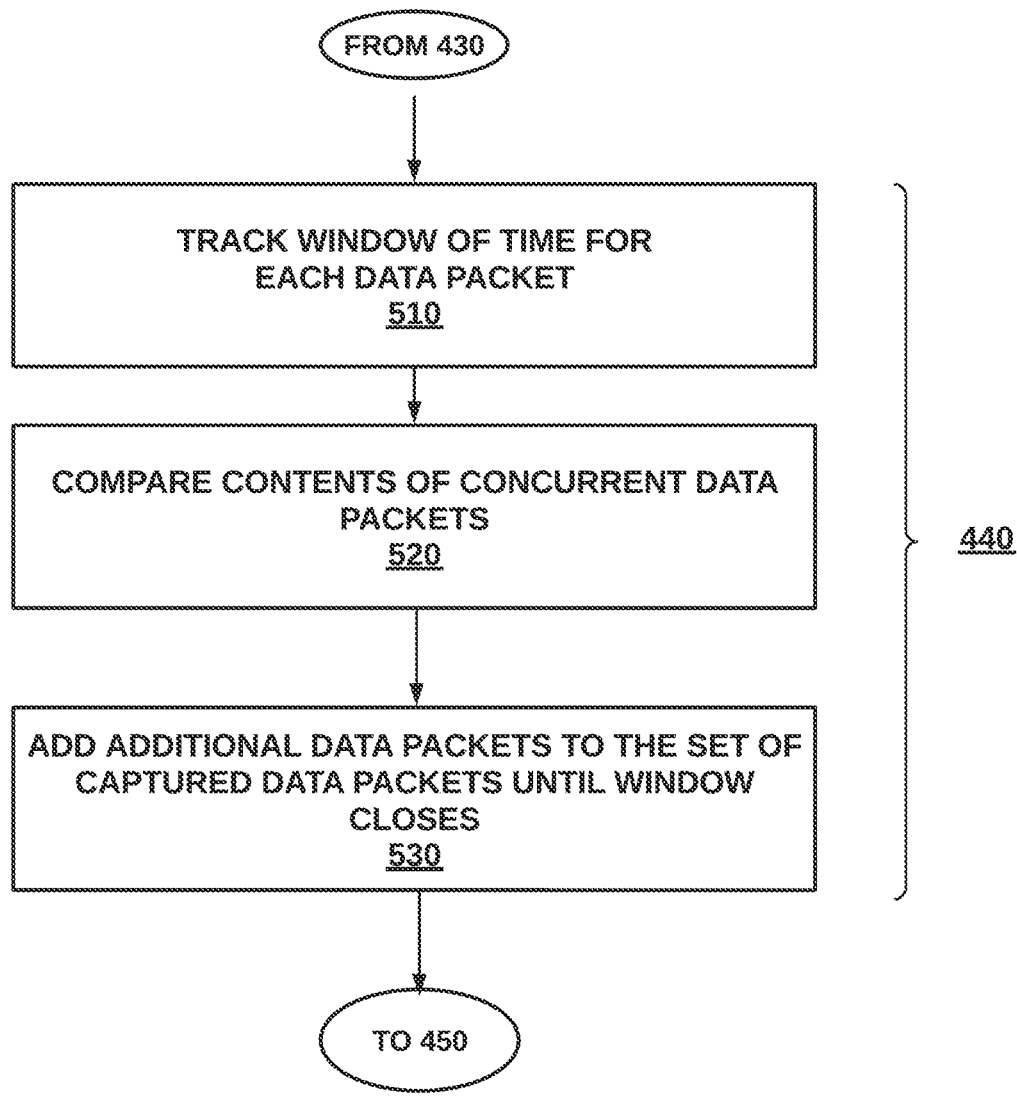
FIG. 5 is a high-level flow diagram illustrating a step for analyzing data packets to identify multiuser data packets, from the method of FIG. 4, according to one embodiment.

FIG. 4 is a high-level flow diagram illustrating a method 400 for capturing multiuser data packets by grouping access points on a wireless network, according to one embodiment. The method 400 can be implemented by, for example, an Wi-Fi controller (e.g., the Wi-Fi controller 110 of FIG. 1).

At step 410 a capture group of access points is formed by a Wi-Fi controller from the plurality of access points dedicating at least one radio from each of the access points for capturing data packets. In one implementation, all available access point forms a group. In another implementation, a subset of access points forms a group.

At step 420, captured data packets are received from the capture group of access points. The data packets are captured at different locations around the wireless network.

At step 430, the captured data packets are analyzed to identify a set of multiuser data packets, as discussed below with respect to FIG. 5. At step 510, captured data packets, in an embodiment, each have a window of time for analysis. During this time, previous and subsequent data packets concurrently received are examined for additional commonalities. At step 520, contents of concurrent data packets can be compared by a hash or other efficient techniques. At step 530, additional data packets are added to the set until a window is closed. Once the window closes the data set is defined and passed to a network security system.

At step 440, the set of identified multiuser data packets is checked against a set of rules for multiuser data packets to troubleshoot wireless network issues.

III. Generic Computing Device (FIG. 6)

FIG. 6 is a block diagram illustrating an exemplary computing device 600 for use in the system 100 of FIG. 1, according to one embodiment. The computing device 600 is an exemplary device that is implementable for each of the components of the system 100, including the multiuser packet identifier 105, the Wi-Fi controller 110, the group of access points 120A-C, and the stations 130A-C. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access applications, an access applications that uses networking, a remote access applications executing locally, a network protocol access applications, a network management access applications, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general purpose processor, an access applications-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

I claim:

1. A computer-implemented method in a Wi-Fi controller communicatively coupled to a data communication network to manage a plurality of access points, for capturing multiuser data packets by grouping access points on a wireless network, the method comprising:

forming a capture group of access points selected from the plurality of access points dedicating at least one radio from each of the access points for capturing data packets;

receiving captured data packets from the capture group of access points, wherein the captured data packets were each captured at, and forwarded from, one of the plurality of access points having multiple transceivers, and wherein at least one of the multiple transceivers is in packet capture mode;

analyzing the captured data packets to identify a set of multiuser data packets based on parallel transmission time and common data from each data packet; and checking the set of multiuser data packets against a set of rules for multiuser data packets to troubleshoot wireless network issues.

2. The method of claim 1, wherein the capture group of access points comprises fewer access points than the plurality of access points.

3. The method of claim 1, wherein each of the capture group of access points has more than one transceiver to transmit and receive data.

4. The method of claim 1, wherein packet capture mode for the capture group of access points is toggled on and off.

5. The method of claim 1, further comprising:
detecting a change in location of the station; and
updating the capture group based on a new location.

6. The method of claim 1, wherein the capture group includes an access point that transmitted the set of multiuser data.

7. The method of claim 1, wherein the captured data packets are received from at least three different access points of the capture group, and wherein the captured data packets are distinct from each other.

8. The method of claim 1, wherein the access point with at least one transceiver in packet capture mode includes at least one transceiver in standard mode.

9. A non-transitory computer-readable medium storing instructions that, when executed by a processor, perform a computer-implemented method in a Wi-Fi controller of a data communication network and communicatively coupled to manage a plurality of access points over a hybrid wireless network of Wi-Fi6E access points and legacy access points without Wi-Fi6E capability, for capturing multiuser data packets by grouping access points on a wireless network, the method comprising:

forming a capture group of access points selected from the plurality of access points dedicating at least one radio from each of the access points for capturing data packets;

receiving captured data packets from the capture group of access points, wherein the captured data packets were each captured at, and forwarded from, one of the plurality of access points having multiple transceivers, and wherein at least one of the multiple transceivers is in packet capture mode;

analyzing the captured data packets to identify a set of multiuser data packets based on parallel transmission time and common data from each data packet; and checking the set of multiuser data packets against a set of rules for multiuser data packets to troubleshoot wireless network issues.

10. The method of claim 9, wherein the capture group of access points comprises fewer access points than the plurality of access points.

11. The method of claim 9, wherein each of the capture group of access points has more than one transceiver to transmit and receive data.

12. The method of claim 9, wherein packet capture mode for the capture group of access points is toggled on and off.

13. The method of claim 9, further comprising:
detecting a change in location of the station; and
updating the capture group based on a new location.

14. The method of claim 9, wherein the capture group includes an access point that transmitted the set of multiuser data.

15. The method of claim 9, wherein the captured data packets are received from at least three different access points of the capture group, and wherein the captured data packets are distinct from each other.

16. The method of claim 9, wherein the access point with at least one transceiver in packet capture mode includes at least one transceiver in standard mode.

17. A Wi-Fi controller of a data communication network and communicatively coupled to manage a plurality of access points over a hybrid wireless network of Wi-Fi6E access points and legacy access points without Wi-Fi6E capability, for capturing multiuser data packets by grouping access points on a wireless network, the Wi-Fi controller comprising:

a processor;

a network interface communicatively coupled to the processor and to the hybrid wireless network; and a memory, communicatively coupled to the processor and storing:

forming a capture group of access points selected from the plurality of access points dedicating at least one radio from each of the access points for capturing data packets;

receiving captured data packets from the capture group of access points, wherein the captured data packets were each captured at, and forwarded from, one of the plurality of access points having multiple transceivers, and wherein at least one of the multiple transceivers is in packet capture mode;

analyzing the captured data packets to identify a set of multiuser data packets based on parallel transmission time and common data from each data packet; and checking the set of multiuser data packets against a set of rules for multiuser data packets to troubleshoot wireless network issues.

18. The Wi-Fi controller of claim 17, wherein the capture group of access points comprises fewer access points than the plurality of access points.

19. The Wi-Fi controller of claim 17, wherein each of the capture group of access points has more than one transceiver to transmit and receive data.

20. The Wi-Fi controller of claim 17, wherein packet capture mode for the capture group of access points is toggled on and off.

* * * * *